United States Patent [19]

Schild

[11] 4,059,350

[45] Nov. 22, 1977

[54] REFLEX SYSTEM FOR CINEMATOGRAPHIC CAMERA

[75] Inventor: Josef Schild, Vienna, Austria

[73] Assignees: Karl Vockenhuber; Raimund Hauser, both of Vienna, Austria

[21] Appl. No.: 713,223

[22] Filed: Aug. 10, 1976

[30] Foreign Application Priority Data

Aug. 11, 1975 Austria .................................. 6232/75

[51] Int. Cl.² .............................................. G03B 7/08
[52] U.S. Cl. .................... 352/141; 352/206; 352/208
[58] Field of Search ......................... 352/141, 206, 208

[56] References Cited

U.S. PATENT DOCUMENTS

3,597,066  8/1971  Wilharm .............................. 352/208

FOREIGN PATENT DOCUMENTS

| | | | |
|---|---|---|---|
| 243,088 | 10/1965 | Austria | 352/141 |
| 1,296,055 | 5/1962 | France | 352/141 |
| 2,144,845 | 3/1972 | Germany | 352/141 |
| 1,185,918 | 1/1965 | Germany | 352/141 |
| 423,463 | 4/1967 | Sweden | 352/141 |
| 1,228,050 | 4/1971 | United Kingdom | 352/141 |

*Primary Examiner*—Monroe H. Hayes
*Attorney, Agent, or Firm*—Montague & Ross

[57] ABSTRACT

A rotating or reciprocating shutter synchronized with the film drive of a cinematographic camera carries or incorporates a light-guiding body of transparent material interposed between the camera objective and its light gate during periods of film transport to direct incident light onto a photoelectric element. The light-guiding body has a flat front surface perpendicular to the optical axis and a generally dihedral internally reflecting rear surface whose faces converge forwardly at a ridge intersecting that axis. One of these rear faces reflects axially incident light rays transversely outwardly through a first lateral surface of the body onto the photoelectric element; the other rear face directs such light rays onto an internally reflecting second lateral surface from which the rays pass through the first lateral surface to the photoelectric element, the second lateral surface being inwardly concave to let slanting incident rays strike the front surface from within at less than the critical angle of the transparent material whereby these rays are internally reflected at that front surface toward the first lateral surface.

7 Claims, 4 Drawing Figures

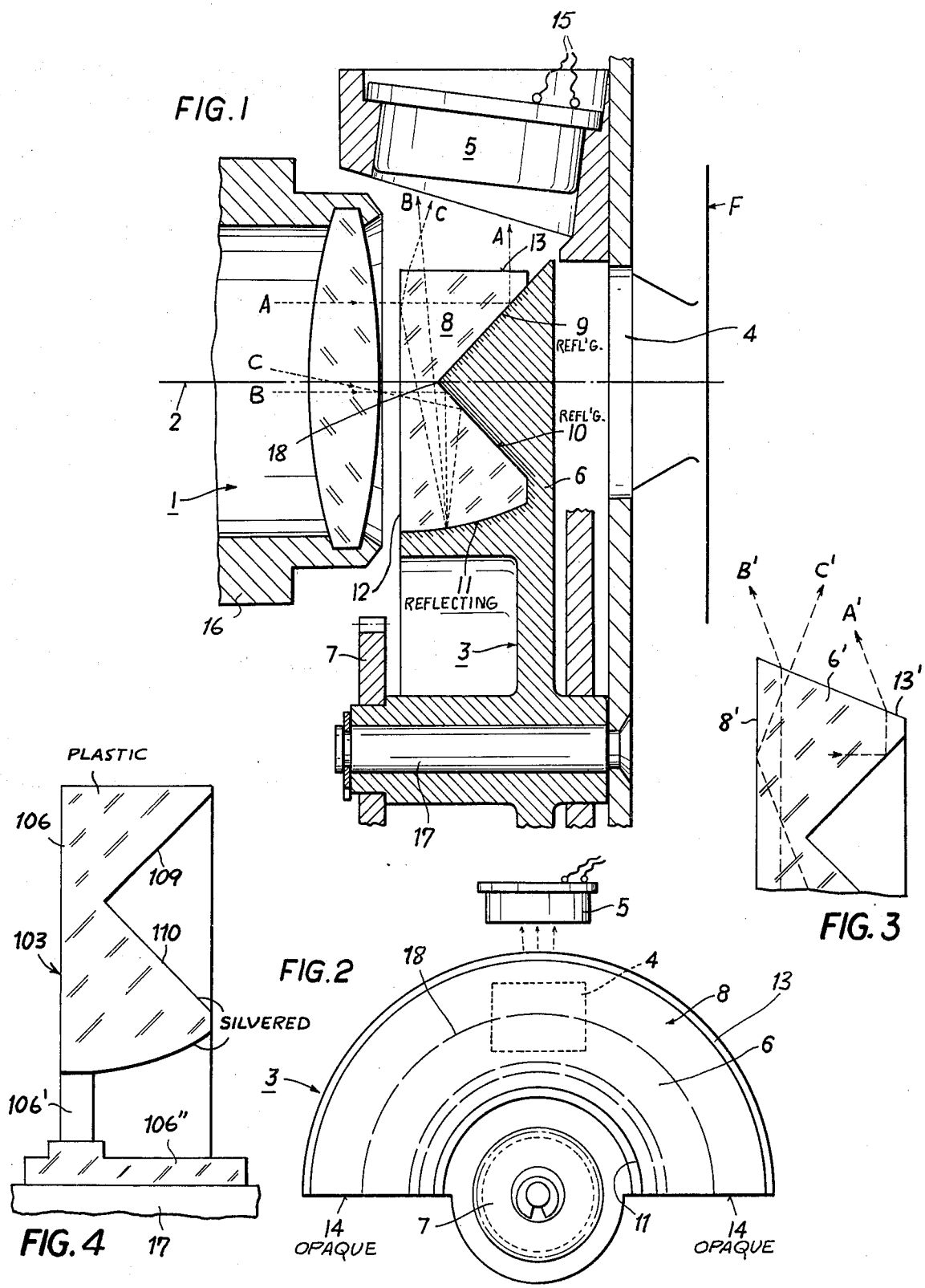

REFLEX SYSTEM FOR CINEMATOGRAPHIC CAMERA

FIELD OF THE INVENTION

My present invention relates to a reflex system for a cinematographic camera of the type wherein a shutter, rotatable or reciprocable in timed relationship with the film drive, carries or incorporates a light-guiding body for directing incident light rays from a camera objective onto a photosensitive device at the instants when, during the film transport, a light gate in line with the objective is blocked by the shutter.

BACKGROUND OF THE INVENTION

In such a reflex system, designed to indicate the luminosity of the object to be filmed and/or to adjust a diaphragm on the basis thereof, certain technical problems must be overcome. For maximum optical sensitivity and minimum temperature fluctuations it is desirable to let the light-guiding body overlie substantially the entire area of the film gate in its operating position in order to direct a maximum amount of incident light onto the photoelectric sensor. Since space limitations generally require such a sensor to be positioned off the objective axis for illumination by light rays substantially perpendicular thereto, a reflecting shutter surface will have to include an angle of about 45° with that axis. If, now, the light-guiding body has a frustoconical reflecting surface extending over the full radial height of the light gate, its axial dimension becomes significant and requires a corresponding increase in the back-focal length of the objective which in turn makes optical corrections difficult.

In commonly owned Austrian Pat. No. 243,088 it has been proposed to let the incident light rays fall upon a reflector of reduced axial depth with a stepped surface, carried by the shutter. A similar system, using an array of Fresnel-type prisms transluminated by axially incident light rays, is shown in Austrian Pat. No. 286,788. In both instances the beam of incident light is only partially utilized since rays striking certain zones of the reflective or refractive light-guiding bodies — or including substantial angles, with the objective axis — will miss the receiving surface of the associated photoelectric sensor. In order to remedy this drawbck, it has already been proposed to position two such transducers at opposite sides of the objective axis, as disclosed in Austrian Pat. No. 265,023; such an arrangement, however, is relatively complex and correspondingly expensive.

OBJECT OF THE INVENTION

The object of my present invention, therefore, is to provide an improved light-guiding body for a reflex system of the character referred to which makes virtually full use of the beam of incident light without objectionably extending the axial depth of a shutter equipped with that body.

SUMMARY OF THE INVENTION

I realize this object, in accordance with the present invention, by using a light-guiding body of transparent material substantially overlying the light gate during intervals of film advance, this body having a front surface proximal to the objective giving passage to incident light rays, an internally reflecting rear surfce proximal to the light gate with two forwardly converging rear faces, a first lateral surface adjoining one of these rear faces for letting light rays reflected by that face pass directly to a photocell or similar sensor, and an internally reflecting second lateral surface opposite the first lateral surface directing light rays reflected by the other rear face toward the first lateral surface for passage to the sensor.

According to another feature of my invention, the second lateral surface (i.e. the one remote from the photoelectric sensor) is inwardly concave and has a curvature directing slanting incident rays from the adjoining rear face to the front surface of the body at a glancing angle which is less than the critical angle of the transparent material whereby such rays are totally reflected at the front surface toward the first lateral surface.

The transparent material may be glass or synthetic resin, such as a polyacrylate. Especially in the latter instance it will be convenient to mold the shutter in one piece with that body whose silvered rear surface blocks the passage of incident light rays toward the film gate in the working position of the shutter.

BRIEF DESCRIPTION OF THE DRAWING

The above and other features of my invention will now be described in detail with reference to the accompanying drawing in which:

FIG. 1 is an axial sectional view of part of a cinematographic camera equipped with a reflex system according to my invention;

FIG. 2 is a front view of a light-reflecting shutter forming part of the system of FIG. 1, drawn to a smaller scale;

FIG. 3 is a fragmentary sectional view or a modified shutter body; and

FIG. 4 is a sectional view showing another shutter and light reflector according to the invention.

SPECIFIC DESCRIPTION

The camera shown in the drawing comprises an objective 1 (illustrated only in part) which is held in a mounting 16 centered on an optical axis 2. A film guide 4 in line with the objective adjoins the path of a motion-picture film F which is intermittently advanced by a non-illustrated transport mechanism, such as a claw drive, as is well known per se. A rotting shutter 3 on a shaft 17 is continuously driven, in timed relationship with the film transport, by a transmission including a gear 7 engaged by nonillustrated pinion on a motor shaft.

Shutter 3 has a sector-shaped body 6, extending here over an arc of 180°, which periodically obstructs the light gate 4 and carries a light-guiding body 8 of transparent material having substantially the same sectoral outline. Body 8, referred to hereinafter as a prism, has a flat front surface 12 transverse to the axis 2 and a generally dihedral rear surface with silvered and therefore internally reflecting frustoconical faces 9 and 10 meeting along an arcuate central ridge 18 which intersects the axis 2 throughout its rotation. Faces 9 and 10 have generatrices which include, like those of the adjoining lands of shutter body 6, an angle of 45° with axis 2. Thus, axially incident light rays A and B are reflected radially outwardly and inwardly toward respective lateral surfaces 13 and 11 forming the inner and outer peripheral boundaries of the prism; surface 13 confronts a photocell 5 with output leads 15 extending to a nonillustrated light indicator. The opposite lateral surface 11 of prism 8 is inwardly concave so that the radially reflected rays B are directed past the ridge 18 on their way to surface 13 and photocell 5. Slanting rays C striking the radially inner rear face 10 are reflected at lateral surface 11 toward front surface 12 at such a small angle that they will not leave the prism but are guided through the peripheral surface 13 toward photocell 5.

As shown in FIG. 3, a modified prism 8' can have a body 6' with a frustoconically rather than cylindrically curved lateral or peripheral surface 13' at which axially incident and generally radially exiting rays A' and B' are forwardly refracted so as to allow a different positioning of the photoelectric sensor.

As illustrated in FIG. 4, a unitary body 106 of transparent material (e.g. a polyacrylate) with silvered rear surfaces 109, 110 can be used as a shutter 103 integral with a light reflector. Body 106 is shown mounted by a radial arm 106' on a hub 106" keyed to shaft 17.

End face, 14 (FIG. 2) of body 6, 6' or 106 can be rendered opaque by a dull-black coating in order to prevent the escape of light rays at those locations.

It will thus be seen that virtually the entire beam of incident light traversing the objective 1 is redirected by the prism 8, 8' or 106 toward a single sensor 5, the combined axial depth of that prism and the shutter being substantially less than that which would be required if the reflecting face 9 (or 109) were extended over the full radial height of light gate 4.

My invention is, of course, not limited to a rotary structure but can also be used with shutters reciprocating linerly or arcuately across a light gate.

I claim:

1. In a cinematographic camera comprising an objective in line with a light gate for illuminating an intermittently advancing film, a shutter periodically interposable between said objective and said light gate during intervals of advance of said film, and photosensitive means for generating a signal indicative of the amount of incident light traversing said objective, said shutter being provided with light-guiding means for directing light rays from said objective onto said photosensitive means during said intervals, the improvements wherein said light-guiding means comprises a body of transparent material substantially overlying said light gate during said intervals, said body having a front surface proximal to said objective giving passage to incident light rays, an internally reflecting rear surface proximal to said light gate with two forwardly converging rear faces, a first lateral surface adjoining one of said rear faces for letting light rays reflected by said one of said rear faces pass directly to said photosensitive means, and an internally reflecting second lateral surface opposite said first lateral surface directing light rays reflected by the other of said rear faces toward said first lateral surface for passage to said photosensitive means.

2. The improvement defined in claim 1 wherein said second lateral surface is inwardly concave with a curvature directing slanting incident rays, reflected by said other of said faces, to said front surface at a glancing angle less than the critical angle of said transparent material whereby such rays are internally reflected at said front surface toward said first lateral surface.

3. The improvement defined in claim 2 wherein said front surface is planar and transverse to the optical axis of said objective, said rear faces meeting at a ridge intersecting said optical axis.

4. The improvement defined in claim 3 wherein said shutter has an axis of rotation parallel to said optical axis, said ridge being arcuately curved about said axis of rotation.

5. The improvement defined in claim 4 wherein said body is generally sector-shaped and provided with opaque end faces lying in substantially radial planes.

6. The improvement defined in claim 3 wherein said rear faces have generatrices including with said optical axis an angle of substantially 45°.

7. The improvement defined in claim 1 wherein said transparent material is a synthetic resin, said body being an integral part of said shutter.

* * * * *